Sept. 2, 1969          S. FIGAR          3,464,403
SENSING DEVICE FOR A PLETHYSMOGRAPH
Filed July 14, 1965          2 Sheets-Sheet 1
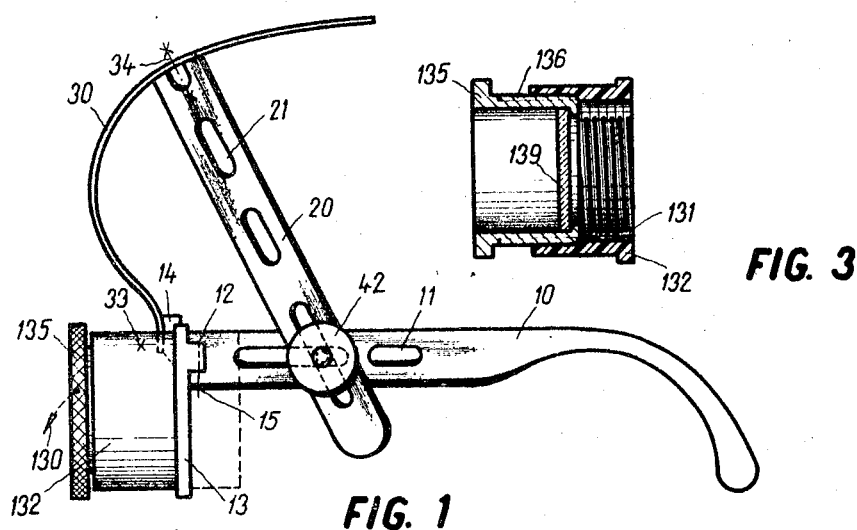
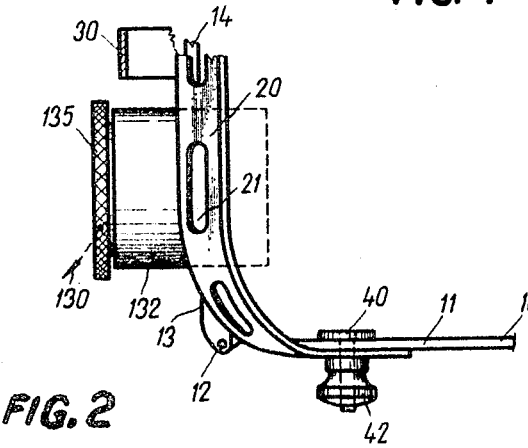
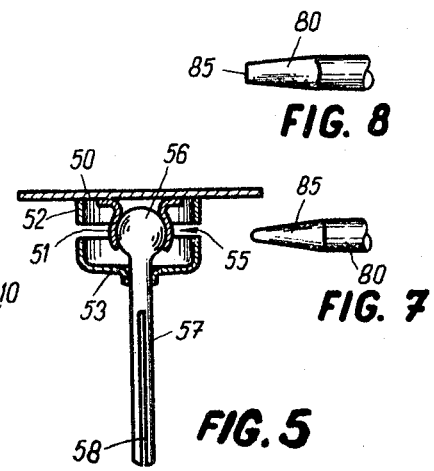
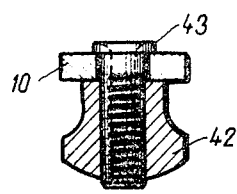
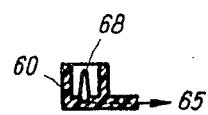
INVENTOR.
Štěpán Figar
BY
Richard INVENTOR.
Štěpán Figar 3,464,403
Patented Sept. 2, 1969

3,464,403
SENSING DEVICE FOR A PLETHYSMOGRAPH
Štěpán Figar, Prague, Czechoslovakia, assignor to
Ceskoslovenska akademie ved, Prague, Czechoslovakia
Filed July 14, 1965, Ser. No. 471,844
Claims priority, application Czechoslovakia,
July 24, 1964, 4,304/64
Int. Cl. A61b *5/02;* A61m *35/00*
U.S. Cl. 128—2.05                                    9 Claims

ABSTRACT OF THE DISCLOSURE

The capacitance measuring circuit of a plethysmograph which includes a spectacle frame on which one or more electrodes are mounted in spaced relationship to the bearer on the temple pieces and/or in the rims normally occupied by glasses. The familiar frame does not produce psychological reactions which would affect the results of the measurements.

---

This invention relates to the investigation of blood circulation and of other factors which affect the volume of portions of the human body, and particularly to plethysmography.

In its more specific aspects, the invention is concerned with a sensing device for a plethysmograph which consists essentially of an electrode assembly and of a carrier for attaching the electrode assembly to the body. The changes in the capacitance of a circuit which includes the electrode are indicative of the volume changes that are being investigated.

The carrier for the electrode of this invention is a spectacle frame or the conventional type in which two annular rims are connected by a bridge and carry respective temple pieces which are hingedly attached to parts of the rims remote from the bridge. A connector releasably fastened to one of the temple pieces holds the electrode assembly.

An electrode assembly mounted on the temple piece can be used for taking capacitance readings on many portions of the head, including the forehead and the temple region. The spectacle frame is light in weight, and its presence does not affect the test conditions because spectacles or sunglasses are familiar to most people, and the carriers of the invention thus are unlikely to produce a nervous reaction which could affect the readings of the plethysmograph.

Other features and many of the attendant advantages of this invention will be readily appreciated as the same becomes better understood by reference to the following detailed description of preferred embodiments when considered in connection with the accompanying drawings wherein:

FIG. 1 shows a sensing device of the invention in side elevation;

FIG. 2 shows the device of FIG. 1 in fragmentary top plan view;

FIG. 3 shows a detail of the device in side-elevational section;

FIGS. 4 and 5 show additional details in front-elevational section;

FIG. 6 shows a cable connector for use with the detail of FIG. 5 in a sectional view;

FIGS. 7 and 8 are fragmentary views of an adjusting tool in front and side elevation respectively;

Figure 9:
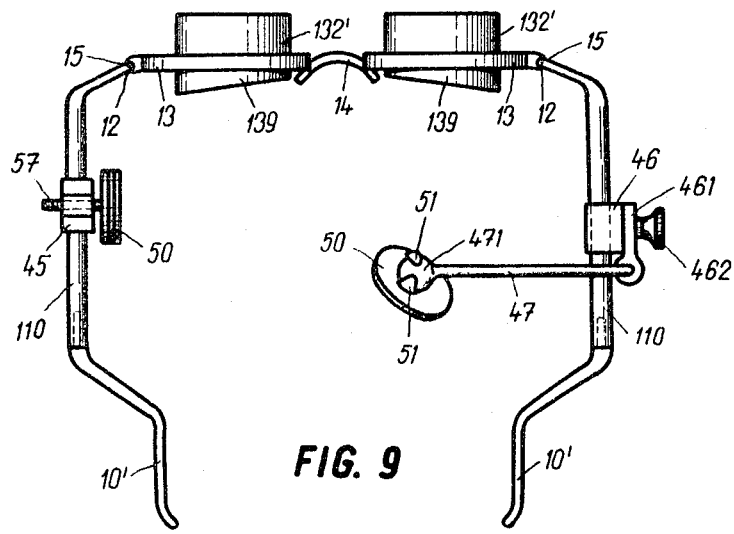
FIG. 9 illustrates a modified sensing device of the invention in plan view.

Referring now to the drawing in detail, and initially to FIGS. 1 and 2, there is shown a spectacle frame which mainly consists of two circular rims 13 which are connected by a bridge 14. Projecting hinge parts 12 of the rims are engaged by pivots pins 15 which secure temple pieces 10 to the rims in a generally known manner.

The temple pieces 10 are flat and are formed with several slots 11 which are elongated lengthwise of the temple pieces. A flat strap 20 provided with several elongated openings 21 therethrough extends in an arc from one temple piece 10 to the other in such a manner as to circle the forehead of a person wearing the frame. The end portions of the strap 20 are fastened to the temple pieces by connectors consisting of a pin 40 whose flat head abuts against the inner face of the associated temple piece, and whose threaded shank passes through an opening 11 and an opening 21 and carries an internally threaded knob 42. The relative angular position of the strap 20 and of other frame elements is secured by a brace 30 which is a flat apertured member similar to the strap 20 and is releasably fastened to the bridge 14 and the strap 20 by bolt-and-nut connections conventionally indicated at 33 and 34.

Each of two electrode assemblies includes a sleeve 132 of plastic or other electrically insulating material coaxially received in a corresponding rim 13, the dimensions of the sleeve being such that the sleeve may be manually adjusted in an axial direction between the fully drawn position and that indicated by broken outlines, and is held in the adjusted position by friction. The sleeve 132 has internal threads 131 which are engaged by mating extenral threads 136 on a flanged metal tube 135. A lead 130 conductively attached to the flange of the tube 135 is the input member of a capacitance bridge, not otherwise shown and provided with an indicating or recording unit in a known manner, and not shown in the drawing. An electrode plate 139 closes the inner end of the tube 135 and is spaced from the corresponding eye of the wearer in all operative positions of the electrode assembly.

Each of the openings 11, 21 may be provided with an additional electrode assembly of the type shown in FIGS. 4 to 6, and such an assembly may also be used for connecting the strap 20 to one or both temple pieces 10. The last mentioned electrode assembly includes a connector shown in FIG. 4, and consisting of an externally threaded insulating bushing 43 having a smooth cylindrical bore, and a knob 42 on the threads of the bushing.

The electrode assembly proper includes a pin 57 one end of which has an axial slot 58 whereby the pin end may be resiliently secured in the bore of the bushing 43. The other end of the pin carries the ball member 56 of a universal joint by means of which a circular electrode plate 50 is attached to the pin. The socket member of the joint is formed by prongs 51 on the electrode 50 better seen in FIG. 9 which shows another embodiment of the invention.

Cylindrical rings 52 and 53 are mounted on the electrode 50 and the pin 57 so as normally to define an annular gap 55 therebetween. The electrode may be shifted angularly in all directions on the temple piece 10 by inserting the wedge shaped end 85 of a tool 80 (FIGS. 7 and 8) into the gap 55 and twisting the tool. The electrode may also be adjusted toward and away from the wearer by longitudinally displacing the pin 57 in the bushing 43.

The electrode 50 is connected to the afore-mentioned capacitance bridge by a cable 65 whose terminal connector portion only is illustrated in FIG. 6. A cup 60 is integrally molded with the insulation of the cable 65, and a short metal blade 68 connected to the conductor of the cable 65 projects into the cavity of the cup 60 for engagement with the slot 58 of the pin 57 when the cup is slipped over the slotted end of the pin.

The mode of operation of the illustrated sensing device is inherent in the structure. The electrode assemblies mounted in the rims 13 may be employed for taking measurements on the eyes of a wearer. They may be coarsely adjusted in the direction of the optical axis of the associated eye by sliding the sleeve 132 in the rim 13. Finer axial adjustment is then made by rotating the tube 135.

Readings on many other portions of the head may be taken by inserting the connector shown in FIG. 4 in any one of the openings 11, 21 or the non-illustrated openings of the brace 30, and by sliding the pin 57 of the electrode arrangement shown in FIG. 5 into the bushing 43 of the connector so that the electrode 50 faces the part of the head to be investigated. The necessary fine adjustment of the elecrtode position is made by means of the tool 80. Obviously, a multiplicity of connectors and electrodes 50 may be employed simultaneously and together with the electrodes 139 mounted on the rims of the frame, and simultaneous readings may be taken on a multi-channel capacitance measuring and recording unit conventional in itself.

A modified electrode supporting structure is shown in FIGS. 9 to 13. The temple parts of the spectacle frame illustrated in FIG. 9 each include a temple piece 110 the main portion of which is a straight slim cylinder of uniform cross section, and is hingedly attached to a rim 13 in the manner described above. An ear loop 10' is releasably secured to each temple piece 110 by frictional telescoping engagement.

Figure 10:
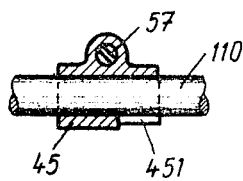
FIGS. 10 and 11 illustrate a detail of the device of FIG. 9 in side-elevational section and in side elevation respectively.
Figure 11:
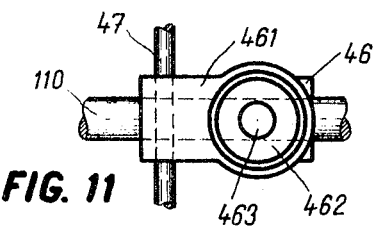

A tubular connector 45 has a bore which slidably receives a temple piece 110, as is best seen in FIG. 10. One axial end of the connector has an axial slot 451 which communicates with the bore, and the two somewhat resilient halves of the connector 45 on either side of the slot 451 strongly converge toward each other when in the relaxed condition so that they frictionally engage the inserted temple piece 110 and secure the axial and angular position of the connector. A transverse bore in a boss of the connector 45 receives the supporting pin 57 of an electrode 50 identical with that shown in FIG. 5.

Another similar electrode 50 is supported on the other temple piece 110 by a connector 46 to which a short arm 461 is attached in angularly adjustable position by a pin 463 and a knob 462. An elongated carrier rod 47 is received in the arm 461 with a friction fit that permits adjustment of the effective length of the rod 47 whose free end carries a ball 471 which forms a universal joint with prongs 51 on an electrode 50 in the manner described with reference to FIG. 5.

The two electrodes 50 shown in FIG. 9 may be used individually, jointly, or together with electrodes mounted on the rims 13. The electrode assemblies and connectors 45, 46 may be removed from the temple pieces 110 by first withdrawing the ear loops 10', and then sliding the connectors long the temple pieces. The electrode assemblies may be attached to the temple pieces by the reversed sequence of the same steps.

Figure 12:
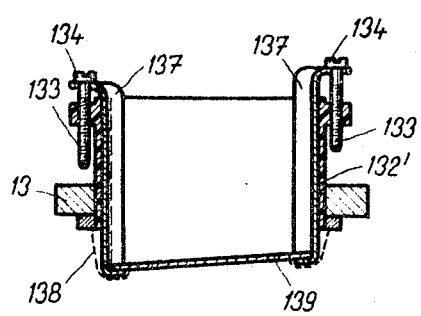
FIG. 12 is a sectional plan view of another detail of the device of FIG. 9.
Figure 13:
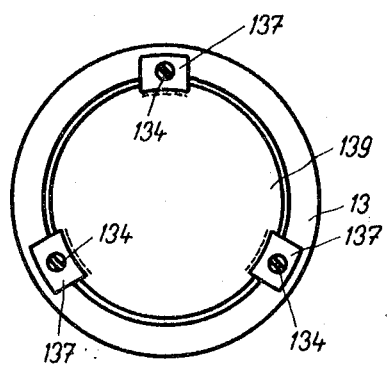
FIG. 13 illustrates the detail of FIG. 12 in front elevation.

The rim mounted electrode assemblies generally indicated in FIG. 9 are seen in more detail in FIGS. 12 and 13. A sleeve 132' is coaxially received in each rim, and is axially slidable therein in the manner described above with reference to FIGS. 1 and 2. Three integral bosses 133 are equiangularly spaced on the outer circumference of the sleeve 132' which consists of plastic or other insulating material. Axial openings in the bosses 133 threadedly receive respective screws 134 which pass through oversized openings in sheet metal brackets 137 of L-shaped cross section. The screw heads provide abutments which prevent axial movement of the brackets 137 in a direction away from the eyes of the wearer.

The brackets extend axially along the inner wall of the sleeve 132' toward the ocular end of the latter. An electrode plate 139 is resiliently held against the end faces of the brackets 137 by a rubber ring 138 which holds the brackets 137 in engagement with the heads of the screws 134. Rotation of the screws 134 permits not only the axial position of the electrode 139 to be adjusted, but also permits the electrode to be tilted relative to the optical axis of the eye tested.

The arrangement shown in FIGS. 9 to 13 provides support for electrodes placed on portions of the head which are not even readily accessible to electrodes mounted on the first-described embodiment of the invention. The parietal and occipital regions of the head may be examined simultaneously with the eyes.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. A sensing device for a plethysmograph comprising, in combination:
   (a) a spectacle frame including two rim portions, a bridge portion connecting the rim portions, and two temple portions attached to respective parts of said rim portions remote from said bridge portion;
   (b) a connector releasably fastened to one of said temple portions, said one temple portion being elongated and of uniform cross section, said connector being formed with a passage therethrough conformingly receiving said temple portion for sliding movement of the connector on said temple portion; and
   (c) an electrode assembly mounted on said connector and attached thereby to said frame.

2. A device as set forth in claim 1, wherein said electrode assembly includes an elongated carrier having one end portion pivotally mounted on said connector and a free end portion, and electrode means secured to said free end portion for universal pivoting movement.

3. A sensing device for a plethysmograph comprising, in combination:
   (a) a spectacle frame including two rim portions, a bridge portion connecting the rim portions, and two temple portions attached to respective parts of said rim portions remote from said bridge portion;
   (b) a connector releasably fastened to one of said temple portions;
   (c) an electrode assembly mounted on said connector and attached thereby to said frame;
   (d) another connector releasably fastened to the other temple portion, said electrode assembly including an elongated strap member formed with a plurality of longitudinally spaced openings therethrough, said connectors respectively engaging two of said openings for securing said strap member to said temple portions;
   (e) electrode means engaging a third one of said openings; and
   (f) brace means interposed between said bridge portion and said strap member.

4. A sensing device for a plethysmograph comprising, in combination:
   (a) a spectacle frame including two rim portions, a bridge portion connecting the rim portions, and two temple portions attached to respective parts of said rim portions remote from said bridge portion;
   (b) a connector releasably fastened to one of said temple portions;
   (c) an electrode assembly mounted on said connector and attached thereby to said frame;

(d) another connector releasably fastened to the other temple portion, said electrode assembly including an elongated strap member formed with a plurality of longitudinally spaced openings therethrough, said connectors respectively engaging two of said openings for securing said strap member to said temple portions; and (e) electrode means engaging a third one of said openings, wherein said electrode means includes an insulating bushing received in said third opening, fastening means releasably securing said bushing to said strap member, a pin member slidably received in said bushing, a universal joint on said pin member, and an electrode supported on said joint.

5. A sensing device for a plethysmograph comprising, in combination:
   (a) a spectacle frame including two rim portions, a bridge portion connecting the rim portions, and two temple portions attached to respective parts of said rim portions remote from said bridge portion;
   (b) a connector releasably fastened to one of said temple portions; and
   (c) an electrode assembly mounted on said connector and attached thereby to said frame, wherein said one temple portion is flat and elongated, and is formed with an opening therethrough in the direction of the thickness of said temple portion, a part of said connector being releasably received in said opening, and wherein said connector includes an insulating bushing received in said opening and fastening means releasably securing said bushing to said temple portion, and said electrode assembly includes an elongated pin member received in said bushing for longitudinal movement, a universal joint on said pin member, and an electrode supported on said joint.

6. A sensing device for a plethysmograph comprising, in combination:
   (a) a spectacle frame including two rim portions, a bridge portion connecting the rim portions, and two temple portions attached to respective parts of said rim portions remote from said bridge portion;
   (b) a connector releasably fastened to one of said temple portions; and
   (c) an electrode assembly mounted on said connector and attached thereby to said frame; further comprising another electrode assembly mounted on one of said rim members, said other electrode assembly including a sleeve member substantially coaxially secured to said one rim member, a tube axially movable in said sleeve member, and an electrode attached to said tube.

7. A sensing device for a plethysmograph comprising, in combination:
   (a) a spectacle frame including two rim portions, a bridge portion connecting the rim portions, and two temple portions attached to respective parts of said rim portions remote from said bridge portion;
   (b) a connector releasably fastened to one of said temple portions; and
   (c) an electrode assembly mounted on said connector and attached thereby to said frame; further comprising another electrode assembly mounted on one of said rim members, said other electrode assembly including a sleeve member substantially coaxially secured to said one rim member, a plurality of bracket members mounted on said sleeve member in circumferentially spaced relationship for movement in an axial direction, means for limiting said movement of said bracket members, and an electrode attached to said plurality of bracket members.

8. A device as set forth in claim 7, further comprising a yieldably resilient member engaging said sleeve member and said electrode and resiliently urging said electrode into abutting engagement with said bracket members.

9. A device for taking plethysmographic readings, comprising in combination:
   (a) a spectacle frame including two rim portions having respective axes, a bridge portion connecting said rim portions, and two temple portions attached to respective parts of said rim portions remote from said bridge portion;
   (b) an electrode assembly including a sleeve member having an axis, an electrode member, and means threadedly securing said members to each other for relative adjusting movement in the direction of the axis of said sleeve member,
      (1) said sleeve member being substantially coaxially received in one of said rim portions for axial sliding movement; and
   (c) a capacitance measuring circuit conductively connected to said electrode.

References Cited

UNITED STATES PATENTS

| | | | |
|---|---|---|---|
| 1,422,396 | 7/1922 | Wappler | 128—418 |
| 1,684,860 | 9/1928 | Catlin | 128—410 |
| 2,426,958 | 9/1947 | Ulett et al. | 128—2.1 |
| 2,549,836 | 4/1951 | McIntyre et al. | 128—2 |
| 3,122,137 | 2/1964 | Erlanger | 128—410 XR |

WILLIAM E. KAMM, Primary Examiner

U.S. Cl. X.R.

128—410